(12) United States Patent
Sohn et al.

(10) Patent No.: US 7,822,111 B2
(45) Date of Patent: Oct. 26, 2010

(54) RECEIVING APPARATUS AND METHOD THEREOF

(75) Inventors: Young-Soo Sohn, Gunpo-si (KR); Seung-Jun Bae, Pohang-si (KR); Hong-Jun Park, Namgu-Pohang-si (KR); Jung-Hwan Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1270 days.

(21) Appl. No.: 11/345,451

(22) Filed: Feb. 2, 2006

(65) Prior Publication Data

US 2006/0176988 A1 Aug. 10, 2006

(30) Foreign Application Priority Data

Feb. 5, 2005 (KR) ................... 10-2005-0011016

(51) Int. Cl.
*H03H 7/30* (2006.01)
*H03H 7/40* (2006.01)
*H03K 5/159* (2006.01)

(52) U.S. Cl. .................................. 375/231; 375/348
(58) Field of Classification Search ......... 375/229–234, 375/316–318, 340, 346, 348
See application file for complete search history.

(56) References Cited

U.S. PATENT DOCUMENTS

| | | | |
|---|---|---|---|
| 6,088,415 A | 7/2000 | Gaudet | |
| 6,680,985 B1 * | 1/2004 | Strodtbeck et al. | 375/320 |
| 2002/0080898 A1 * | 6/2002 | Agazzi et al. | 375/355 |
| 2002/0191431 A1 * | 12/2002 | Huang et al. | 363/148 |
| 2004/0066867 A1 | 4/2004 | Fujimori et al. | |
| 2005/0190871 A1 * | 9/2005 | Sedarat | 375/350 |
| 2006/0093028 A1 * | 5/2006 | Balan et al. | 375/233 |
| 2006/0158225 A1 * | 7/2006 | Stojanovic et al. | 326/87 |
| 2009/0010269 A1 * | 1/2009 | Larsson et al. | 370/400 |

FOREIGN PATENT DOCUMENTS

JP 2000-196418 7/2000

* cited by examiner

*Primary Examiner*—David C Payne
*Assistant Examiner*—James M Perez
(74) *Attorney, Agent, or Firm*—Harness, Dickey & Pierce, P.L.C.

(57) ABSTRACT

Example embodiments relate to a receiving apparatus and method thereof. In an example, the receiving apparatus may include a clock generating unit generating a plurality of internal clock signals based on a received external clock signal and an equalization receiving unit receiving the plurality of internal clock signals and an input signal. The equalization receiving unit may determine an offset value and an equalization coefficient in an initial setting mode and may adjust the received data signal based on the determined offset value and equalization coefficient.

28 Claims, 8 Drawing Sheets

US 7,822,111 B2

RECEIVING APPARATUS AND METHOD THEREOF

PRIORITY STATEMENT

This application claims benefit of priority under 35 USC §119 from Korean Patent Application No. 10-2005-0011016, filed on Feb. 5, 2005, in the Korean Intellectual Property Office, the contents of which is incorporated herein by reference in its entirety.

BACKGROUND OF THE INVENTION

1. Field of the Invention

Example embodiments of the present invention relate generally to a receiving apparatus and method thereof, and more particularly to a receiving apparatus for receiving a data signal and method thereof.

2. Description of the Related Art

FIG. 1 is a block diagram illustrating a conventional transceiver 100. Referring to FIG. 1, the transceiver 100 may include a transmitting end 11 and a receiving end 12. If the transmitting end 11 transmits data through a serial link (e.g., a universal serial bus (USB), an advance technology attachment (ATA), etc.), noise generated by inter-symbol interference (ISI), reflection and/or crosstalk of a channel may be reduced with an adaptive equalizer 13 included within the receiving end 12. In order to synchronize a clock signal with data received by the receiving end 12, a clock data recovery circuit (CDR) 14 for recovering the clock signal from the received data may be employed. The adaptive equalizer 13 and the CDR 14 may extract an equalization coefficient and phase information associated with the clock signal from the signal transmitted through the channel in order to synchronize with the received data for proper data extraction.

However, in a number of conventional memory types (e.g., a dynamic random access memory (DRAM)), the above-described conventional process may typically not be employed due to performance degrading characteristics such as an increased latency, an increased chip area and/or an increased power consumption.

In a DRAM interface system, a distance from a memory controller to a DRAM chip may be a given distance (e.g., 20 cm). Accordingly, once the channel characteristics from the transmitting end 11 to the receiving end 12 are determined, the channel characteristics may not vary substantially over time. Thus, in DRAM interface systems, once the channel characteristics are determined, the equalization coefficient and phase information may be measured less frequently.

SUMMARY OF THE INVENTION

An example embodiment of the present invention is directed to a receiving apparatus, including a clock generating unit generating a plurality of internal clock signals based on a received external clock signal and an equalization receiving unit receiving the plurality of internal clock signals and an input signal, determining an offset value and an equalization coefficient based on the plurality of internal clock signals and the input signal, and adjusting a received data signal based on the determined offset value and equalization coefficient.

Another example embodiment of the present invention is directed to a method of receiving data, including receiving an external clock signal and an input signal, generating a plurality of internal clock signals based on the received external clock signal, determining an offset value and an equalization coefficient based on the plurality of internal clock signals and the input signal and adjusting a received data signal based on the determined offset value and equalization coefficient.

Another example embodiment of the present invention is directed to a receiving apparatus which may be applied to a DRAM interface system and may perform digital compensation with reduced power consumption and/or reduced chip area.

Another example embodiment of the present invention is directed to a clock generating unit which may receive two adjacent internal clock signals among a plurality of internal clock signals and a controlling signal and may synchronize the phases of the plurality of internal clock signals to that of a received data signal in response to the controlling signal. The clock generating unit may change a most significant bit (MSB) value of the controlling signal to change the phase of the internal clock by T/2 after determining the controlling signal in an initial setting mode, where T may be a period of data within the received data signal.

BRIEF DESCRIPTION OF THE DRAWINGS

The accompanying drawings are included to provide a further understanding of example embodiments of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Figure 1:
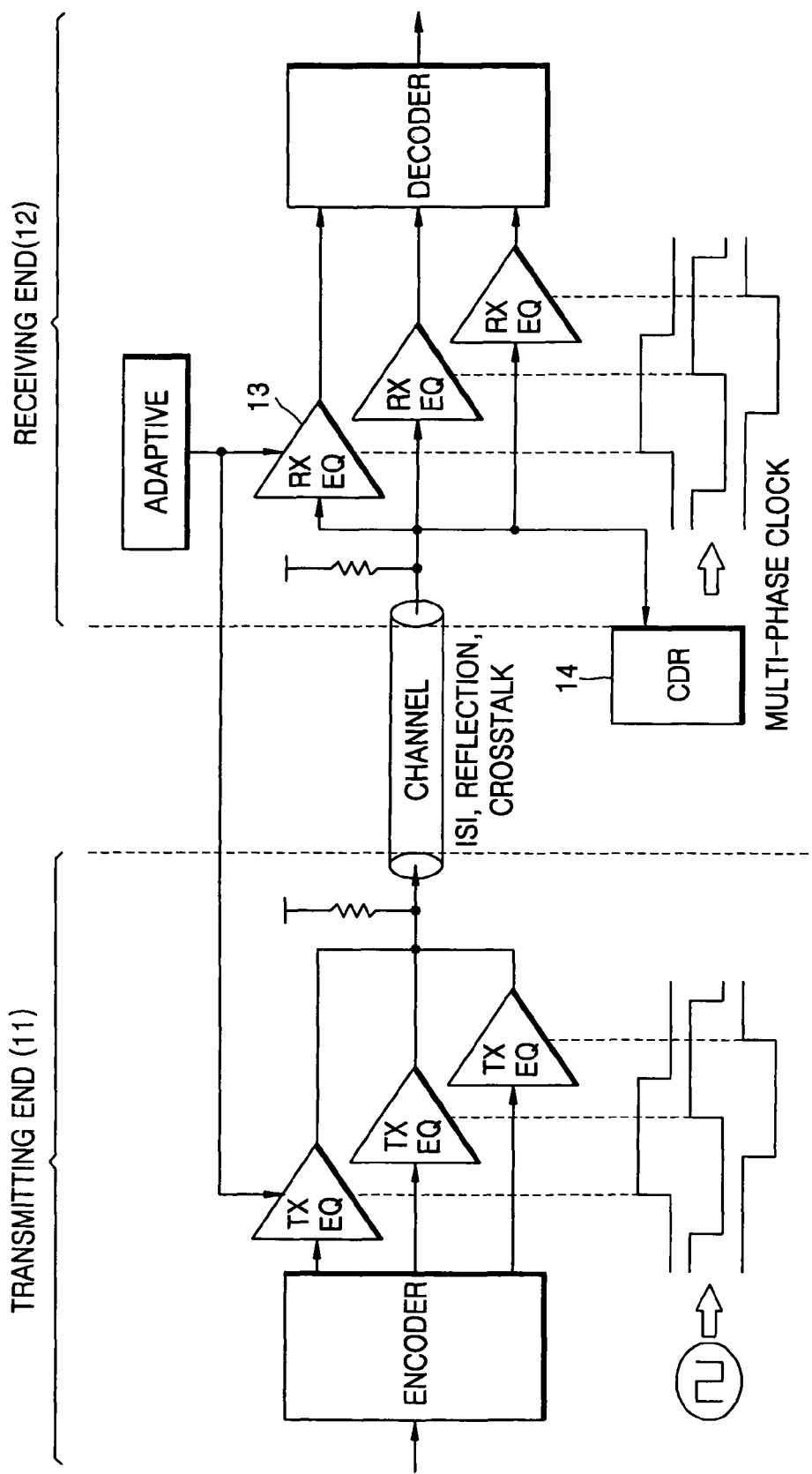
FIG. 1 is a block diagram illustrating a conventional transceiver.

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
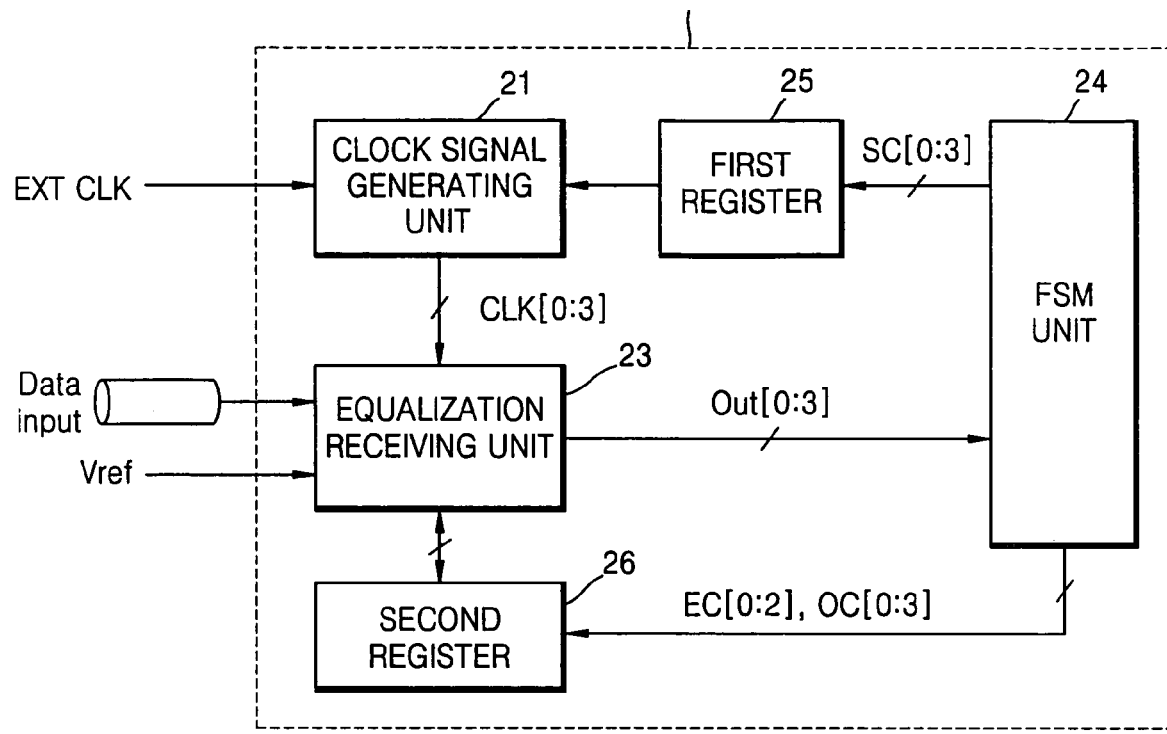
FIG. 2 is a block diagram of a receiving apparatus according to an example embodiment of the present invention.

FIG. 2 is a block diagram of a receiving apparatus 20 according to an example embodiment of the present invention. In an example, the receiving apparatus 20 may be representative of a DRAM receiving apparatus.

In the example embodiment of FIG. 2, the receiving apparatus 20 may include a clock generating unit 21, an equalization receiving unit 23, a finite state machine (FSM) unit 24 and first and second registers 25 and 26. The clock generating unit 21 may receive an external clock signal EXT CLK with a frequency which may be 1/n of a data transmission rate. The clock generating unit 21 may generate n internal clock signals with different phases such that a transition portion (e.g., a falling edge) of each of the n internal clock signals may be aligned with at least a portion (e.g., the center) of a data changing period. Hereinafter, it will be assumed that n may equal 4. However, it is understood that other example embodiments of the present invention may include a clock generating unit configured to generate any number of clock signals with any number of phases.

In the example embodiment of FIG. 2, the equalization receiving unit 23 may determine an equalization coefficient and an offset value (e.g., which may remain constant) in an initial setting mode, may receive a data signal Data_input (e.g., from an external device) and four internal clock signals (e.g., because the example embodiment of FIG. 2 is described with n being equal to 4 for example purposes) from the clock generating unit 21, and may digitally compensate the data signal based on the equalization coefficient and the offset value, and may output digital-compensated data Out[0:3] to the FSM unit 24.

In the example embodiment of FIG. 2, the FSM unit 24 may generate skew controlling signals sc[0:3] for adjusting a phase changing value of the clock generating unit 21, equalization coefficient controlling signals ec[0:2] for adjusting the equalization coefficient generated by the equalization receiving unit 23, and offset controlling signals oc[0:3] for adjusting the offset value in response to the output signal Out[0:3].

In the example embodiment of FIG. 2, the first register 25 may store the skew controlling signals sc[0:3] output from the FSM unit 24 and may transfer the skew controlling signals sc[0:3] to the clock generating unit 21. The second register 26 may store the equalization coefficient controlling signals ec[0:2] and the offset controlling signals oc[0:3] received from the FSM unit 24 and may transfer the received equalization coefficient controlling signals ec[0:2] and the offset controlling signals oc[0:3] to the equalization receiving unit 23.

In the example embodiment of FIG. 2, the receiving apparatus 20 may adjust receiver parameters based on the channel characteristics determined in the initial setting mode such that a channel (e.g., a DRAM channel) may be used irrespective of whether a multi-drop method and/or a point-to-point method may be employed at the receiver.

Figure 3A:
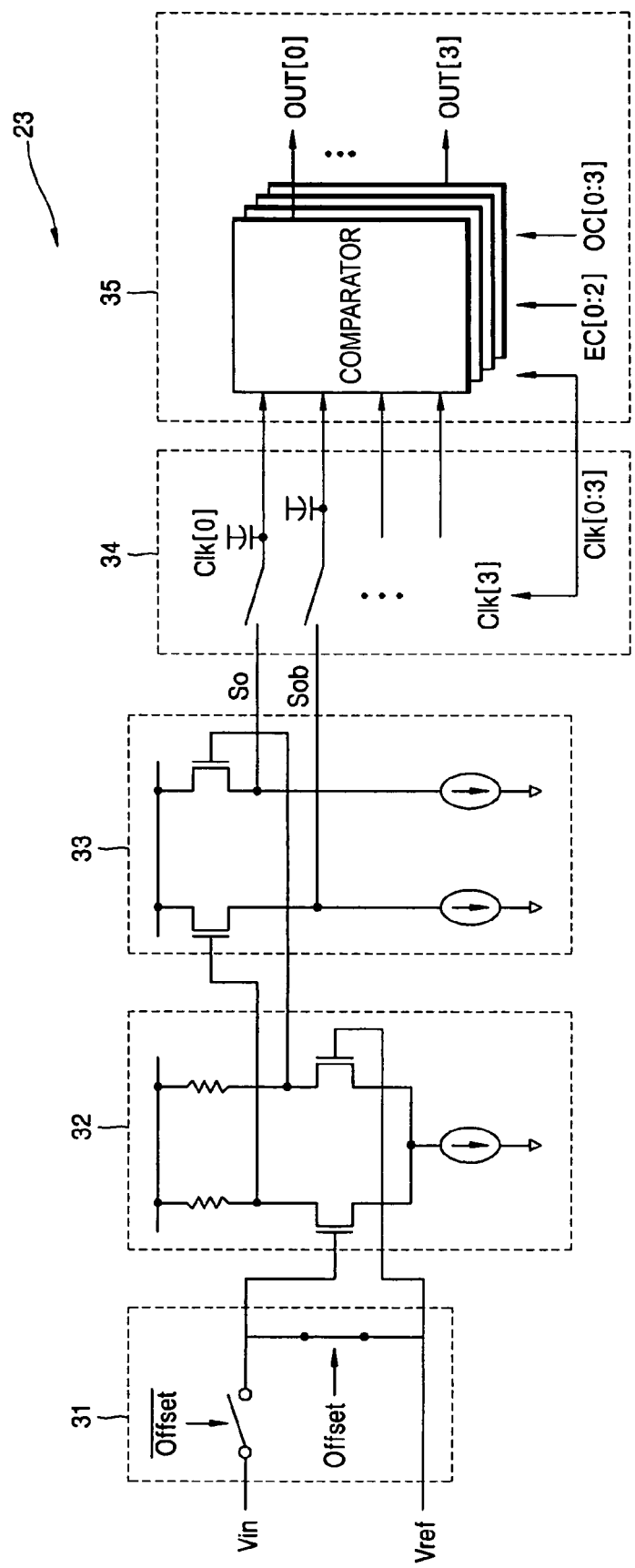
FIG. 3A is a circuit diagram of an equalization receiving unit according to another example embodiment of the present invention.

FIG. 3A is a circuit diagram of the equalization receiving unit 23 of FIG. 2 according to another example embodiment of the present invention. In the example embodiment of FIG. 3A, the equalization receiving unit 23 may include a signal input unit 31, a pre-amplifier 32, a source follower circuit 33, a track and hold circuit 34 and an equalization comparator 35.

Figure 3B:
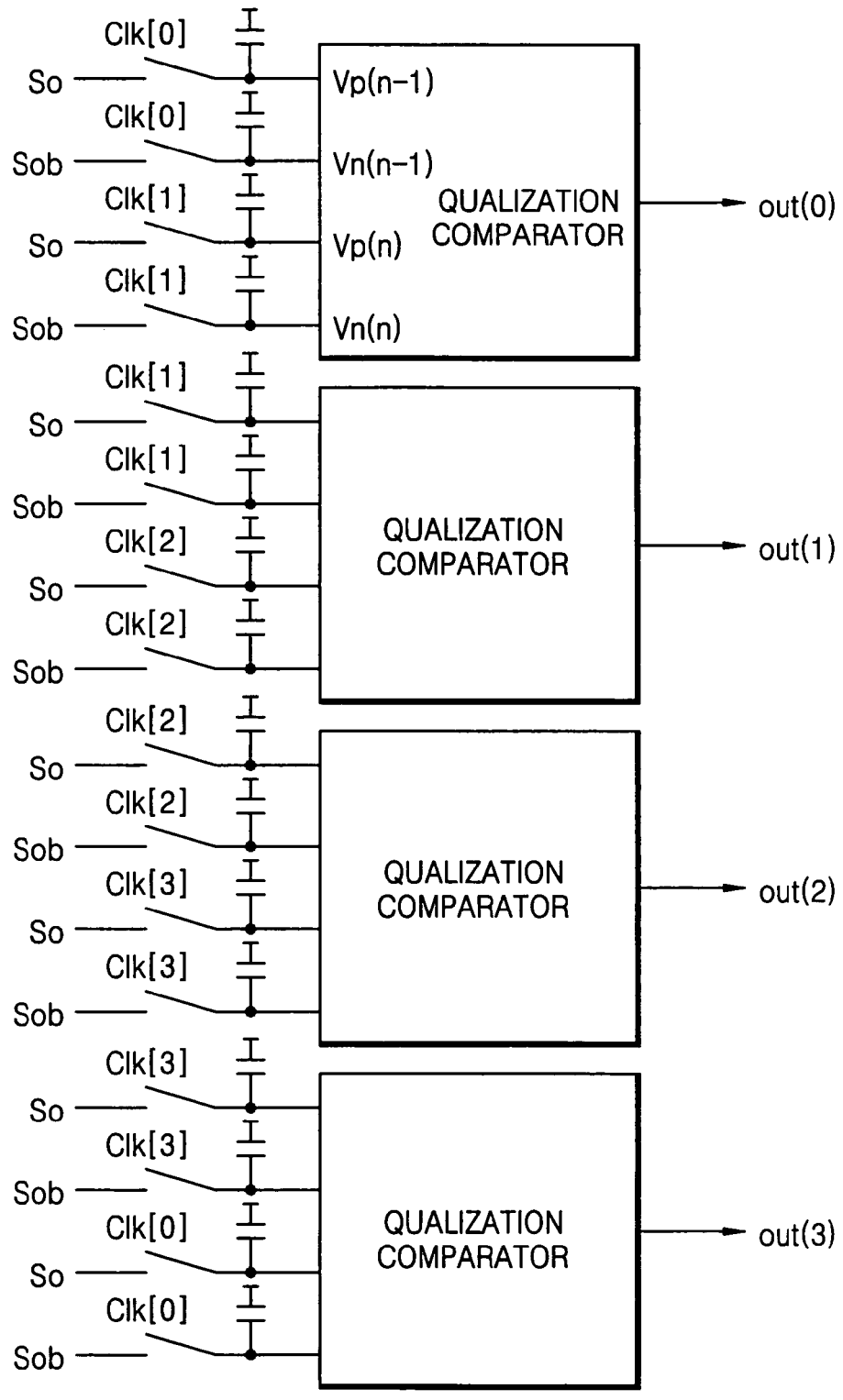
FIG. 3B is a circuit diagram of a track and hold circuit and an equalization comparator according to another example embodiment of the present invention.

FIG. 3B is a circuit diagram of the track and hold circuit 34 and the equalization comparator 35 of FIG. 3A according to another example embodiment of the present invention. In the example embodiments of FIGS. 3A and 3B, so and sob may be output signals of a source terminal of the source follower circuit 33.

In the example embodiment of FIG. 3A, the signal input unit 31 may include a data signal input port Vin for receiving the data signal and a reference signal input port Vref for receiving a reference signal. The signal input unit 31 may transfer the received data signal to the pre-amplifier 32. The signal input unit 31 may stop reception of the data signal from the data signal input port Vin (e.g., by opening a switch) in response to an offset correcting signal Offset and may connect the data signal input port Vin with the reference signal input port Vref (e.g., by closing a switch) to equalize logic levels at each of the signal input ports Vin and Vref. While the switch at the data signal input port Vin is open and the signal input ports Vin and Vref are connected, the FSM unit 24 may generate the offset controlling signals oc[0:3] such that the output of the equalization receiving unit 23 may repeatedly transition between a first logic level (e.g., a higher logic level or logic "1") and a second logic level (e.g., a lower logic level or logic "1"). An operation of the signal input unit 31 where the switches controlled by the offset correct signal Offset have reversed statuses (e.g., the data signal input port Vin switch may be open and the connecting switch between the signal input ports Vin and Vref may be closed) will be described later in greater detail.

In the example embodiment of FIG. 3A, the pre-amplifier 32 may compare the received data signal at the data signal input port Vin with the reference signal received at the reference signal input port Vref to generate a differential signal. If an operating frequency of the received data signal is within a frequency range of the pre-amplifier 32, a higher-frequency noise may be applied to the received data signal and/or the reference signal may be reduced. Accordingly, the received data signal may be converted into the differential signal by the pre-amplifier 32 with less noise because noise in the received data signal may be reduced by a common mode noise reducing function and an effect of the higher-frequency noise may likewise be reduced.

In the example embodiment of FIG. 3A, the source follower circuit 33 may reduce an output impedance of the differential signal received from the pre-amplifier 32 to increase a level of bandwidth.

In the example embodiments of FIGS. 3A and 3B, the track and hold circuit 34 may sample and store the differential signal received from the source follower circuit 33. In an example, the received differential signal may be an analog signal synchronized with the four internal clock signals clk[0:3] to perform a feedforward equalization function. Accordingly, four sampled output values may be generated and output to the equalization comparator 35.

In the example embodiment of FIGS. 3A and 3B, the equalization comparator 35 may reduce the offset of the sampled data using the equalization coefficient and the offset value to perform an equalization function.

Figure 4:
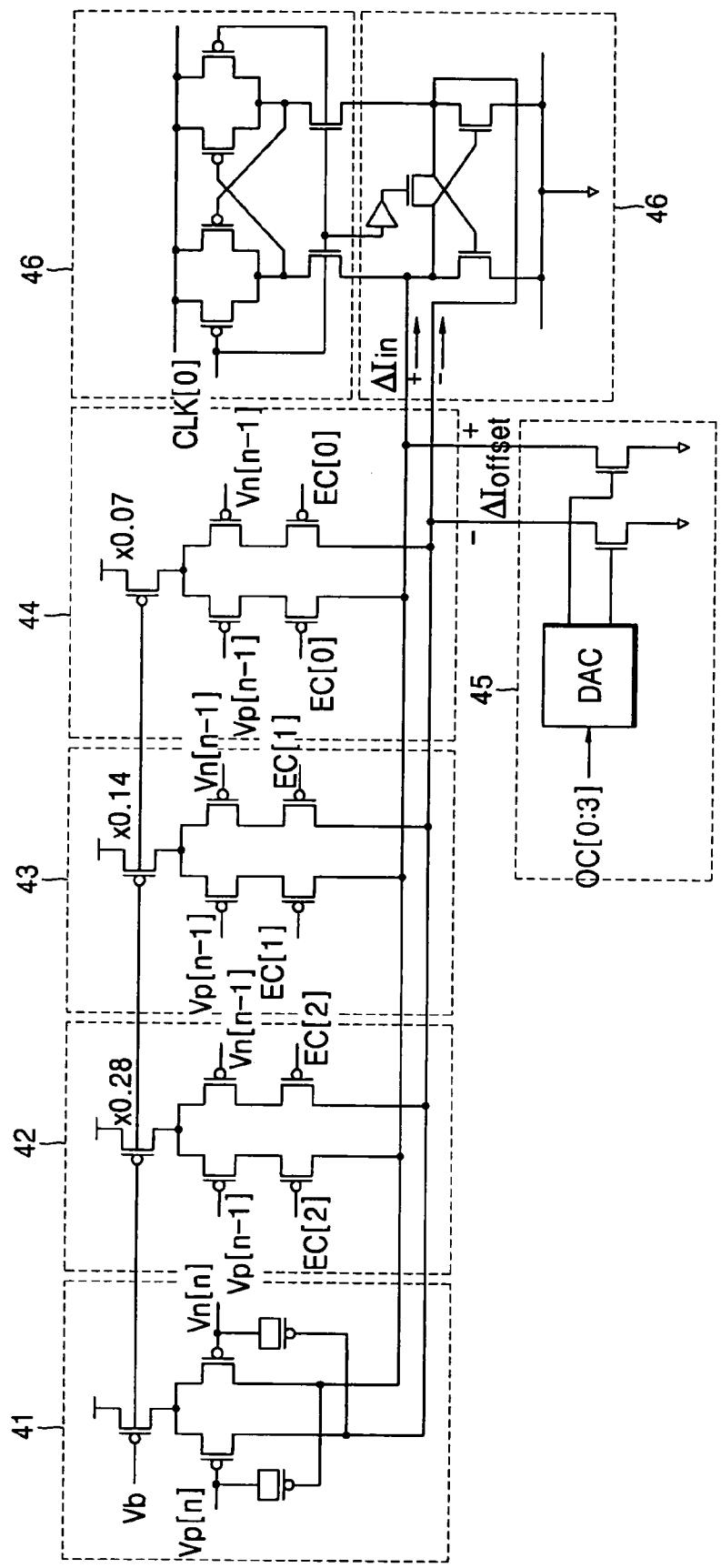
FIG. 4 is a circuit diagram illustrating the equalization comparator of FIG. 3B according to another example embodiment of the present invention.

FIG. 4 is a circuit diagram illustrating the equalization comparator 35 according to another example embodiment of the present invention.

In the example embodiment of FIG. 4, the equalization comparator 35 may be synchronized with the internal clock signal clk[0]. The equalization comparator 35 may include a first differential operating unit 41 for obtaining a difference between a data signal Vp[n] (e.g., a currently received data signal) and an inverted data signal Vn[n] thereof, and second through fourth differential operating units 42, 43 and 44 for obtaining a difference between a data signal Vp[n−1] (e.g., a previously received data signal, such as one clock period before a clock period associated with the data signal Vp(n)) and an inverted data signal Vn[n−1] thereof. The equalization comparator 35 may further include an offset current generating unit 45, a latch unit 46 and an adding unit 47.

In the example embodiment of FIG. 4, the offset current generating unit 45 may generate an offset current ΔIoffset corresponding to the offset controlling signals oc[0:3]. The adding unit 47 may add the currents received from the first through fourth differential operating units 41 through 44 to the current received from the offset current generating unit 45. The latch unit 46 may latch the resultant sum computed by the adding unit 47.

In the example embodiment of FIG. 4, the current sources of the second through fourth differential operating units 42, 43 and 44 may have a higher current level as compared to the current source of the first differential operating unit 41. In an example, the current sources of the second through fourth differential operating units 42, 43 and 44 may be 0.28, 0.14, and 0.07 times the current source of the first differential operating unit 41, respectively. In further examples, the second differential operating unit 42 may be controlled (e.g., turned on/off) in response to a first bit ec[2] of the equalization coefficient controlling signals ec[0:2], the third differential operating unit 43 may be controlled (e.g., turned on/off) by a second bit ec[1] of the equalization coefficient controlling signals ec[0:2], and the fourth differential operating unit 44 may be controlled (e.g., turned on/off) by a third bit ec[0] of the equalization coefficient controlling signals ec[0:2]. Accordingly, the sum of the currents of the second through fourth differential operating units 42 to 44 may be adjusted by controlling the equalization coefficient controlling signal such that the sum may equal the product of the equalization coefficient and a current proportional to the voltage difference between the previous data signal Vp[n−1] and the inverted data signal Vn[n−1].

In the example embodiment of FIG. 4, the equalization comparator 35 may subtract the product of a current proportional to Vp[n−1]−Vn[n−1] and the equalization coefficient from a current proportional to the voltage difference between the current data signal Vp[n] and the inverted data signal Vn[n] to perform a feedforward equalization function. In order to change the equalization coefficient, the values gm of the second through fourth differential operating units 42 to 44 for converting the previous data value Vp[n−1] into current along with the equalization coefficient controlling signals ec[0:2] may be adjusted.

In the example embodiment of FIG. 4, the equalization coefficient controlling signals ec[0:2] may be used to assign the equalization coefficient to one of a plurality (e.g., eight) values. Generally, if the number of equalization coefficient controlling signals is increased, more accurate equalization may be performed. However, since the number of differential operating units generating the differential signals for the summation of the previous data signal may also be increased, a circuit complexity may increase. Accordingly, a system designer may determine a number of equalization controlling signals to employ based on a trade-off between circuit complexity and equalization accuracy. In an example, the value of the equalization coefficient may be adjusted by 0.07 if a value of an equalization constant of the controlling signals is changed by 1 bit.

In the example embodiment of FIG. 4, the equalization comparator 35 may perform an equalization function and an offset reducing function. The offset current generating unit 45 may generate an offset current ΔIoffset based on the offset controlling signals oc[0:3] received from the FSM unit 24 and may transfer the offset current ΔIoffset to the adding unit 47.

In the example embodiment of FIG. 4, the latch unit 46 may latch the current output by the adding unit 47 by resetting a sense amplifier included in the latch unit 46 when the clock signal clk[0] is set to the second logic level (e.g., a lower logic level or "0") and may amplify a fine current difference ΔIin output from an output node of the sense amplifier when the clock signal clk[0] is set to the first logic level (e.g., a higher logic level or "1") and may convert the fine current difference ΔIin into full swing data.

In the example embodiment of FIG. 4, the offset removing function of the equalization comparator 35 may be performed by adding the output signals of the first through fourth differential operating units 41 through 44 and the offset current ΔIoffset in the adding unit 47.

Figure 5:
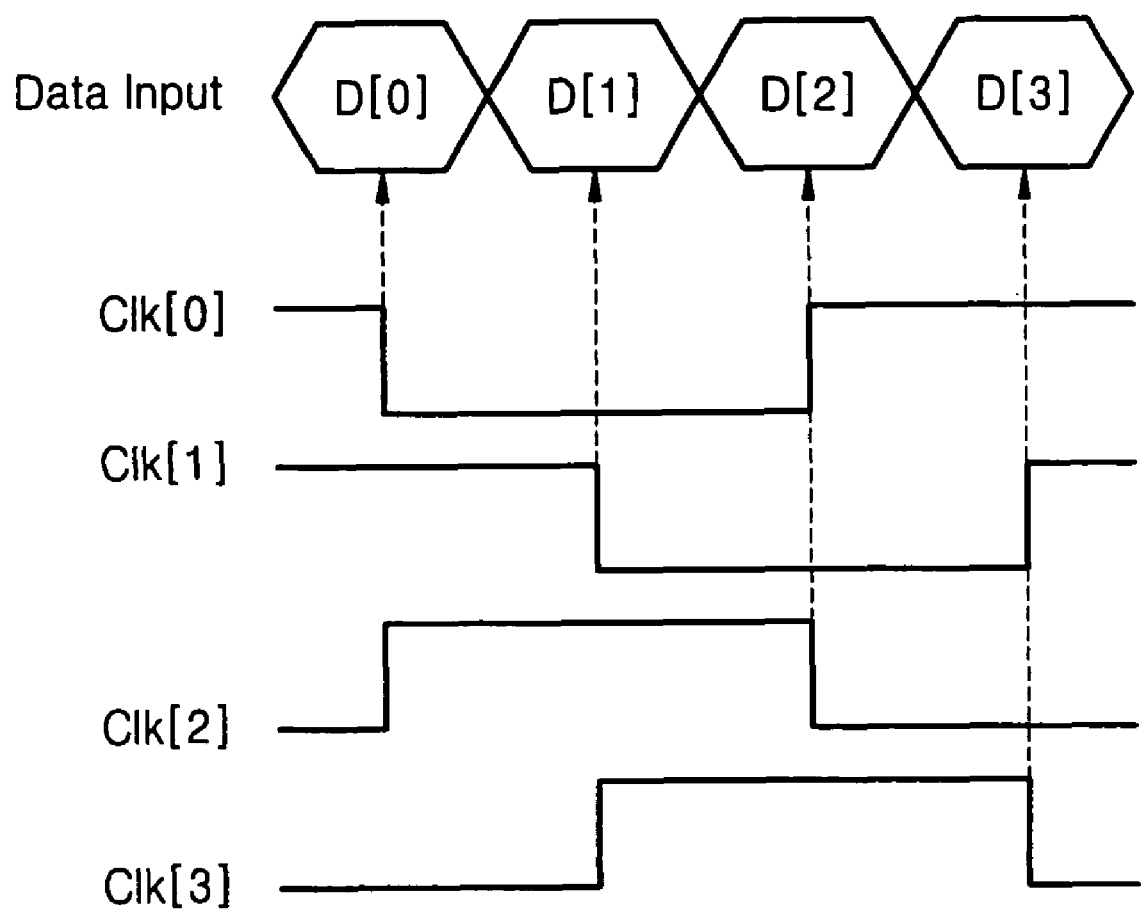
FIG. 5 is a timing diagram illustrating data signals and clock signals generated by the equalization receiving unit of FIG. 3A according to another example embodiment of the present invention.

FIG. 5 is a timing diagram illustrating data signals and clock signals generated by the equalization receiving unit 23 of FIG. 3A according to another example embodiment of the present invention.

In the example embodiment of FIG. 5, the equalization receiving unit 23 may extract received data using a 1:4 de-multiplexing method. In an example referring to FIGS. 3A and 4, the track and hold circuit 34 may sample the received data at a first edge (e.g., a falling edge) of a sampling clock. A data read operation may be performed at the latch unit 46 to determine the received data content based on an internal clock signal.

Hereinafter, an example process for determining an equalization coefficient α in the initial setting mode of the receiving apparatus 20 will be described.

Figure 6:
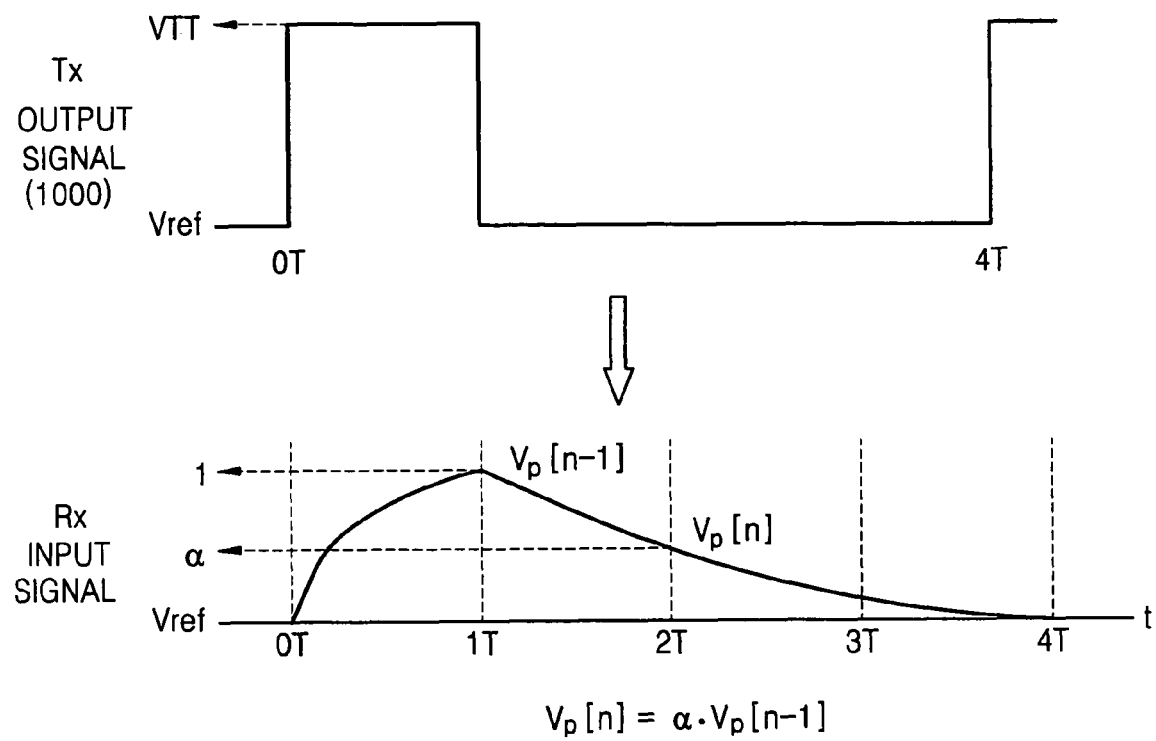
FIG. 6 is a timing diagram illustrating a signal used for determining an equalization coefficient according to another example embodiment of the present invention.

FIG. 6 is a timing diagram illustrating a signal used for determining the equalization coefficient according to another example embodiment of the present invention.

In an example, referring to FIG. 6, an output signal of a transmitter (e.g., transmitting to the receiving apparatus 20 of FIG. 2) may include a logic sequence of "1000". An input signal received at the receiver (e.g., including receiving apparatus 20) may be the signal received when the transmitter notifies the channel having a limited bandwidth. If the analog value of the data in the received signal (e.g., which may be input during one period 1T of the input signal) is Vp[n−1] and an interference level remaining after two periods 2T is Vp[n], then the following relationship may be attained $$V_p[n]=\alpha \cdot V_p[n-1]$$ Equation 1

In a further example, if the input signal received at the receiving apparatus 20 of FIG. 6 is input to the equalization comparator 35 after the offset is corrected in the initial setting mode (e.g., as in above-described example embodiments of the present invention), the output of the equalization comparator 35 may be expressed by $$\text{Sign}(V_p[n]-\alpha \cdot V_p[n-1])$$ Equation 2

Accordingly, the equalization coefficient controlling signals ec[0:2] may be adjusted by the FSM unit 24 such that an output of the equalization comparator 35 may repeatedly transition between the first logic level and the second logic level. The equalization coefficient during the transitioning of the equalization comparator 35 may be equal to the equalization coefficient α of the receiving apparatus 20. If the equalization coefficient α is determined, the equalization coefficient controlling signals ec[0:2] may be stored in the second register 26.

In another example embodiment of the present invention, referring to Equation 2, Vp[n] may represent the difference between the input signal received at the receiving apparatus 20 and a lower voltage threshold (e.g., a minimum voltage). In an example, the lower voltage threshold may be the reference voltage Vref of the receiving apparatus 20, and the transmitting end may transmit the pulse signal having a logic sequence of "1000" as well as an amplitude of a power supply voltage VTT from the reference voltage Vref in the initial setting mode.

In the example embodiment of FIG. 3B, the equalization receiving unit 23 may include four equalization comparators 35 corresponding to four internal clock signals. As discussed above, the number "4" has been selected for ease of explanation only, and it is understood that other example embodiments of the present invention may scale to any number of clock signals, equalization comparators 35, etc. In order to determine the output value corresponding to a period 2T among the four equalization comparators 35, before determining the equalization coefficient in the initial setting mode, the equalization comparator 35 outputting the first logic level (e.g., a higher logic level or logic "1") may be detected from the four equalization comparators when the transmitter transmits "1000" with a normal voltage width. The equalization coefficient may then be determined from the detected equalization comparator 35 (e.g., the equalization comparator receiving the "1" of the "1000"). If the determined equalization coefficient is applied at the receiving apparatus 20, noise due to channel interference may be reduced.

Figure 7:
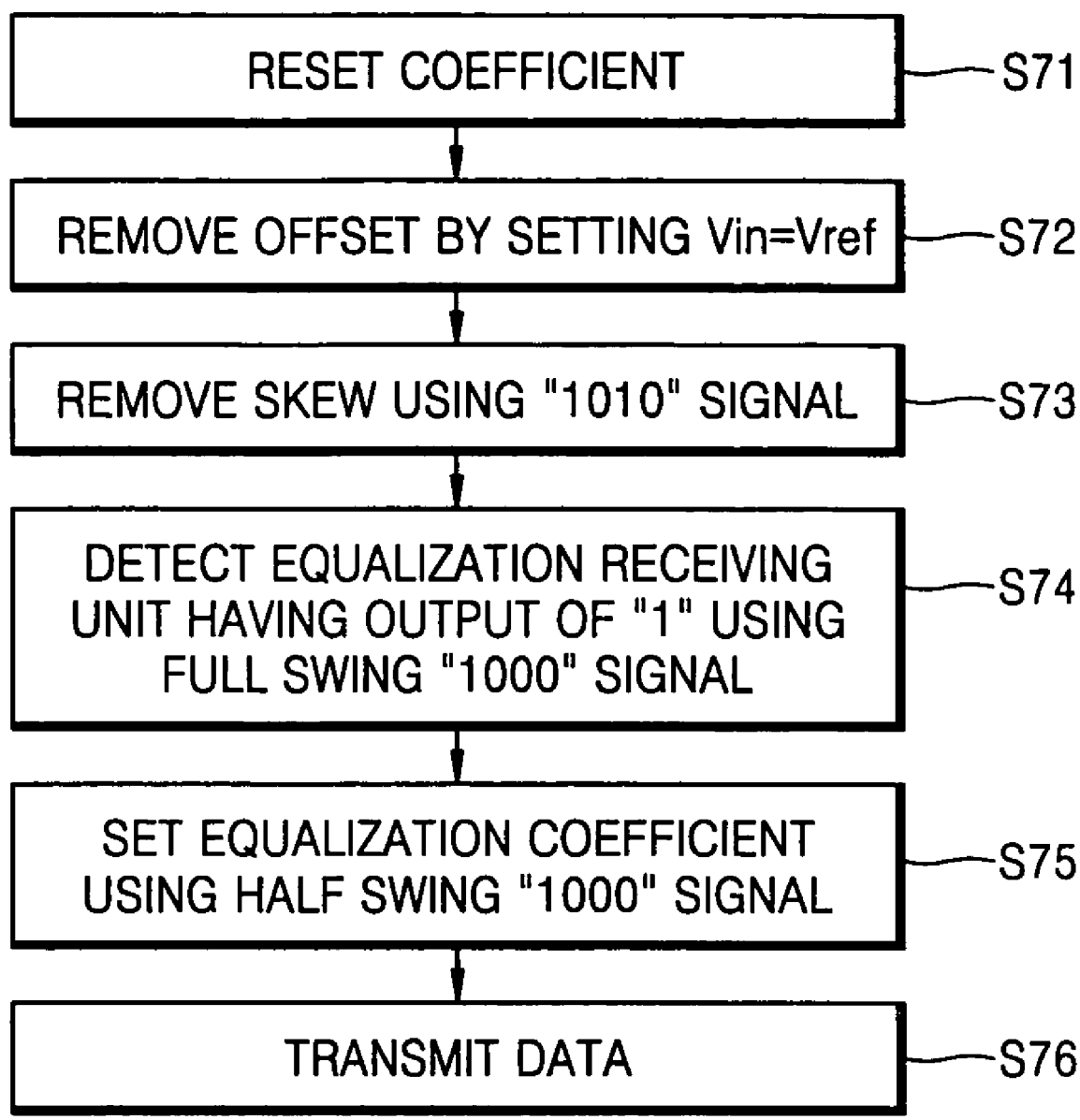
FIG. 7 is a flowchart illustrating an initialization process for adjusting equalization in the receiving apparatus of FIG. 2 according to another example embodiment of the present invention.

FIG. 7 is a flowchart illustrating an initialization process for adjusting equalization in the receiving apparatus 20 of FIG. 2 according to another example embodiment of the present invention.

In the example embodiment of FIG. 7, each of the coefficients of the equalization receiving unit 23 may be reset (at S71). An input voltage offset of the equalization receiving unit 23 may then be removed (at S72), which may be performed by shorting the signal input ports Vin and Vref such that the reference signal and the data input signal may be equalized. Accordingly, the data input signal may adopt characteristics of a clock or reference signal and may repeatedly transition between the first and second logic levels.

In the example embodiment of FIG. 7, a skew reducing operation for reducing (e.g., removing) skew between the data input signal and the internal clock signals may be performed (at S73). In performing the skew reducing operation, a transmitting end may transmit a clock signal having a logic sequence of "1010". If the offset and skew correction of the equalization receiver are completed, the receiving apparatus 20 may operate with a higher (e.g., maximum) voltage margin and a higher (e.g., maximum) time margin.

In the example embodiment of FIG. 7, the equalization coefficient for reducing the interference between the signals may be set (at S74 and S75). In determining the equalization coefficient, the equalization receiving unit 23 receiving a signal at the first logic level (e.g., a higher logic level or logic "1") which may be detected at the four equalization comparators 35. The transmitting end may transmit a logic sequence of "1000" having a full swing and may determine the equalization coefficient based on the equalization receiving unit 23 which may receive the signal at the first logic level at one of the four equalization comparators 35 (at S74). The transmitting end may transmit a pulse signal having a logic sequence of "1000" with an amplitude of the higher level voltage of the reference voltage (at S75). The equalization coefficient may be determined and the receiving apparatus 20 may use the determined equalization coefficient to reduce an inter-symbol interference (ISI) value and the input voltage offset value. Also, the phase of the internal clock signals used in the equalization receiving unit 23 may be adjusted to allow data in the data input signal to be extracted.

In the example embodiment of FIG. 7, after the initial setting mode is completed, normal data (e.g., data other than the "1000" trigger) may be transmitted (at S76). Accordingly, data may be transmitted with the voltage margin and the time margin and accordingly a higher data transmission rate may be obtained.

Example embodiments of the present invention being thus described, it will be obvious that the same may be varied in many ways. For example, while the above-described example embodiments of the present invention are directed generally to circuits configured for operation with four internal clock signals (e.g., by including four equalization comparators 35, etc.), it is understood that other example embodiments of the present invention may be directed to circuits which may scale to accommodate for any number of clock signals.

Further, while particular logic sequences (e.g., "1000", "1010", etc.) have been above described with respect to example embodiments of the present invention, it is understood that other example embodiments may be configured to operate with other logic sequences.

Further, while the above-described example embodiments include references to the first and second logic levels, in one example the first logic level may refer to a higher logic level and the second logic level may refer to a lower logic level. Alternatively, in another example, the first logic level may refer to a lower logic level and the second logic level may refer to a higher logic level.

Further, while above-described example embodiments are directed generally to a DRAM interface implementation of the receiving apparatus 20, it is understood that other example embodiments of the present invention may be directed to any memory type.

Such variations are not to be regarded as departure from the spirit and scope of example embodiments of the present invention, and all such modifications as would be obvious to one skilled in the art are intended to be included within the scope of the following claims.

What is claimed is:

1. A receiving apparatus, comprising:
   a clock generating unit generating a plurality of internal clock signals based on a received external clock signal;
   an equalization receiving unit receiving the plurality of internal clock signals, a reference signal and a data signal, the equalization receiving unit determining an offset value and an equalization coefficient in an initial setting mode and adjusting the received data signal based on the determined offset value and equalization coefficient; and
   a finite state machine (FSM) unit generating a first controlling signal that adjusts a phase changing value generated by the clock generating unit, a second controlling signal for adjusting the equalization coefficient and a third controlling signal for adjusting the offset value, the first, second and third controlling signals generated in response to an output signal of the equalization receiving unit, wherein
      a reference signal input port receives the reference signal and is connected with a data signal input port that receives the data signal in response to an offset correcting signal,
      the FSM unit generates the third controlling signal for controlling the output of the equalization receiving unit,
      the offset value is determined based on the third controlling signal generated by the FSM unit in the initial setting mode,
      the equalization receiving unit includes a signal input unit including the data signal input port and the reference signal input port, and the signal input unit cuts off the data signal received at the data signal input port in response to the offset correcting signal in the initial setting mode.

2. The receiving apparatus of claim 1, wherein the external clock signal has a frequency which is 1/n times a data transmission rate and the plurality of internal clock signals have a plurality of different phases, each of the plurality of different phases aligned with data transmitted at the data transmission rate, and
   the equalization receiving unit compares the input signal with previously received data to determine the equalization coefficient, and adjusts the received data signal by performing a digital compensation.

3. The receiving apparatus of claim 1, further comprising:
   at least one register receiving and storing the first, second and third controlling signals.

4. A receiving apparatus, comprising:
   a clock generating unit generating a plurality of internal clock signals based on a received external clock signal;
   an equalization receiving unit receiving the plurality of internal clock signals, a reference signal and a data signal, the equalization receiving unit determining an offset value and an equalization coefficient in an initial setting mode and adjusting the received data signal based on the determined offset value and equalization coefficient; and
   a finite state machine (FSM) unit generating a first controlling signal for adjusting a phase changing value generated by the clock generating unit, a second controlling signal for adjusting the equalization coefficient and a third controlling signal for adjusting the offset value, the first, second and third controlling signals generated in response to an output signal of the equalization receiving unit, wherein
      a reference signal input port receives the reference signal and is connected with a data signal input port that receives the data signal in response to an offset correcting signal,
      the FSM unit generates the third controlling signal for controlling the output of the equalization receiving unit, and
      the offset value is determined based on the third controlling signal generated by the FSM unit in the initial setting mode; and
   wherein the equalization receiving unit includes:
      a signal input unit including the data signal input port and the reference signal input port;
      a pre-amplifier comparing the received data signal with the reference signal and generating a differential signal based on the comparison;
      a track and hold circuit sampling and storing the differential signal so as to perform a feedforward equalization function; and
      an equalization comparator performing a data signal equalizing function and an offset reducing function using the equalization coefficient and the offset value.

5. The receiving apparatus of claim 4, wherein the equalization receiving unit further comprises:
   a source follower connected to the pre-amplifier for reducing an output impedance of the differential signal to increase a bandwidth of the differential signal.

6. The receiving apparatus of claim 5, wherein the data signal is received with a logic sequence including at least "1000" and the inter-symbol interference (ISI) satisfies $$Vp[n] = \alpha \times Vp[n-1]$$

where $Vp[n-1]$ is an analog output value after one period of the data signal, $Vp[n]$ is an amount of inter-symbol interference remaining after two periods of the data signal, and $\alpha$ is a ratio of $Vp[n-1]$ to $Vp[n]$.

7. The receiving apparatus of claim 4, wherein the signal input unit cuts off the data signal received at the data signal input port in response to the offset correcting signal in the initial setting mode and connects the data signal input port to the reference signal input port.

8. The receiving apparatus of claim 4, wherein the FSM unit generates the third controlling signal such that the output of the equalization receiving unit repeatedly transitions between a first logic level and a second logic level.

9. The receiving apparatus of claim 8, wherein the equalization receiving unit obtains a ratio of inter-symbol interference (ISI) remaining after a given period of time to output characteristics of the data signal and determines the equalization coefficient based on the obtained ratio.

10. The receiving apparatus of claim 4, wherein the equalization comparator includes a plurality of equalizers which are synchronized with the plurality of internal clock signals, each of the plurality of equalizers including:

a first differential operating unit obtaining a difference between a current data signal and an inverted version of the current data signal;

a plurality of second differential operating units obtaining a difference between a previous data signal received before the current data signal and an inverted version of the previous data signal;

an offset current generating unit generating an offset current corresponding to a controlling signal for adjusting the offset value;

an adding unit adding outputs of the first differential operating unit, the plurality of the second differential operating units and the offset current generating unit; and a latch unit latching and amplifying an output of the adding unit based on the plurality of internal clock signals to extract data from the received data signal, wherein power supply currents of the plurality of second differential operating units are a times that of the first differential operating unit, where α is a number determined by a controlling signal for adjusting the equalization coefficient.

11. The receiving apparatus of 10, wherein the plurality of second differential operating units correspond to respective bits of the controlling signal for adjusting the equalization coefficient, and the power supply currents of the second differential operating units are k*m times as a power supply current of the first differential operating unit, where m is the bit placement of the controlling signal for adjusting the equalization coefficient and k is a constant, and the current output from the second differential operating units is controlled according to the respective bit values of the controlling signal for adjusting the equalization coefficient.

12. The receiving apparatus of claim 10, wherein FSM unit determines α when an output value of the equalization comparator repeatedly transitions between first and second logic values and the data signal has a given logic sequence in the initial setting mode.

13. The receiving apparatus of claim 12, wherein the given logic sequence includes "1000".

14. The receiving apparatus of claim 4, wherein the clock generating unit receives two adjacent internal clock signals among the plurality of internal clock signals and the first controlling signal and synchronizes the phases of the plurality of internal clock signals to that of the received data signal in response to the first controlling signal.

15. A method of receiving data, comprising:
receiving an external clock signal, a reference signal and a data signal;
generating a plurality of internal clock signals based on the received external clock signal;
determining an offset value and an equalization coefficient in an initial setting mode; and
adjusting, in an equalization receiving unit including a signal input unit that includes a reference signal input port and a data signal input port, the received data signal based on the determined offset value and equalization coefficient, wherein determining the offset value includes
connecting the reference input port that receives the reference signal with the data signal input port that receives the data signal in response to an offset correcting signal and cutting off the data signal received at the data signal input port of the equalization receiving unit in response to the offset correcting signal in the initial setting mode,
generating an offset controlling signal that controls an output of the equalization receiving unit from a finite state machine (FSM) unit, and
determining the offset value based on the offset controlling signal generated from the FSM unit.

16. The method of claim 15, wherein the received data signal is received from a transmitter to detect one of a plurality of equalization receivers and further to detect a level of inter-symbol interference associated with the one equalization receiver.

17. A receiving apparatus performing the method of claim 15.

18. The method of claim 15, wherein the FSM unit generates the offset controlling signal such that the output of the equalization receiving unit repeatedly transitions between a first logic level and a second logic level.

19. The method of claim 18, wherein the equalization receiving unit obtains a ratio of inter-symbol interference (ISI) remaining after a given period of time to output characteristics of the input signal and determines the equalization coefficient based on the obtained ratio.

20. A method of receiving data, comprising:
receiving an external clock signal, a reference signal and a data signal;
generating a plurality of internal clock signals based on the received external clock signal;
determining an offset value and an equalization coefficient in an initial setting mode;
adjusting, in an equalization receiving unit, the received data signal based on the determined offset value and equalization coefficient, wherein determining the offset value includes
connecting a reference input port that receives the reference signal with a data signal input port that receives the data signal in response to an offset correcting signal,
generating an offset controlling signal for controlling an output of the equalization receiving unit from a finite state machine (FSM) unit, and
determining the offset value based on the offset controlling signal generated from the FSM unit;
resetting a plurality of coefficients associated with the equalization receiving unit;
connecting the data signal input port and the reference signal input port and setting the offset controlling signal such that the output value of the equalization receiving unit repeatedly transitions between a first logic level and a second logic level;
aligning phases of the plurality of internal clock signals such that falling edges are aligned with data in the received data signal; and
transmitting the adjusted data signal,
wherein the received data signal includes a given logic sequence and determining the equalization coefficient is based on a ratio between a peak value of an output signal and a level of inter-symbol interference.

21. The method of claim 20, further comprising:
setting a skew controlling signal to reduce skew.

22. The method of claim 20, wherein aligning phases of the plurality of internal clock signals includes
receiving the external clock signal having a frequency which is 1/n times a data transmission rate and generating the plurality of internal clock signals with difference phases throughout a phase range associated with the data transmission rate,
receiving the data signal including the given logic sequence, and adjusting the phases of the plurality of internal clock signals to be synchronized with an edge of the received data signal using two adjacent internal clock signals from among the plurality of internal clock signals.

23. The method of claim 22, wherein the given logic sequence includes "1010".

24. The method of claim 20, wherein the given logic sequence includes at least "1000" and the level of inter-symbol interference satisfies $$Vp[n]=\alpha \times Vp[n-1]$$

where Vp[n−1] is an analog output value after one period of the data signal, Vp[n] is the level of inter-symbol interference remaining after two periods of the data signal, and a is a ratio of Vp[n−1] to Vp[n].

25. The method of claim 20, wherein transmitting the adjusted data signal includes
- outputting a first current corresponding to the received data signal, the received data signal being a current data signal,
- outputting a second current corresponding to a previous data signal, the previous data signal received at least one period before the received data signal,
- generating an offset current corresponding to the offset controlling signal,
- adding the first current, the second current and the offset current, and
- latching and amplifying the added currents to extract data, wherein the first current is a times the second current and a is determined based on an equalization coefficient controlling signal.

26. A receiving apparatus, comprising:
a clock generating unit generating a plurality of internal clock signals based on a received external clock signal;
an equalization receiving unit receiving the plurality of internal clock signals, a reference signal and a data signal, the equalization receiving unit determining an offset value and an equalization coefficient in an initial setting mode, and adjusting the received data signal based on the determined offset value and equalization coefficient; and
a finite state machine (FSM) unit generating a first controlling signal for adjusting a phase changing value generated by the clock generating unit, a second controlling signal for adjusting the equalization coefficient and a third controlling signal for adjusting the offset value, the first, second and third controlling signals generated in response to an output signal of the equalization receiving unit, wherein, during the initial setting mode,
the equalization receiving unit generates a first output signal under a first condition, the FSM unit generates the second controlling signal for controlling the value of the first output signal, and the equalization coefficient is determined based on the second controlling signal generated from the FSM unit, and the equalization receiving unit generates a second output signal under a second condition, the FSM unit generates the third controlling signal for controlling the value of the second output signal, and the offset value is determined based on the third controlling signal generated from the FSM unit, and, wherein the equalization receiving unit includes a signal input unit including a data signal input port and a reference signal input port, and the signal input unit cuts off the data signal received at the data signal input port in response to an offset correcting signal in the initial setting mode.

27. The receiving apparatus of claim 26, wherein, under the first condition, the reference signal input port receiving the reference signal is connected with the data signal input port receiving the data signal in response to the offset correcting signal, and the first output signal is controlled to repeatedly transition between a first logic level and a second logic level.

28. The receiving apparatus of claim 27, wherein, under the second condition, the data signal having a predetermined pattern is provided to the equalization receiving, unit, and the second output signal is controlled to repeatedly transition between the first logic level and the second logic level.

* * * * *